No. 840,653. PATENTED JAN. 8, 1907.
A. A. PAGE.
KNOB ATTACHMENT.
APPLICATION FILED JULY 13, 1905.
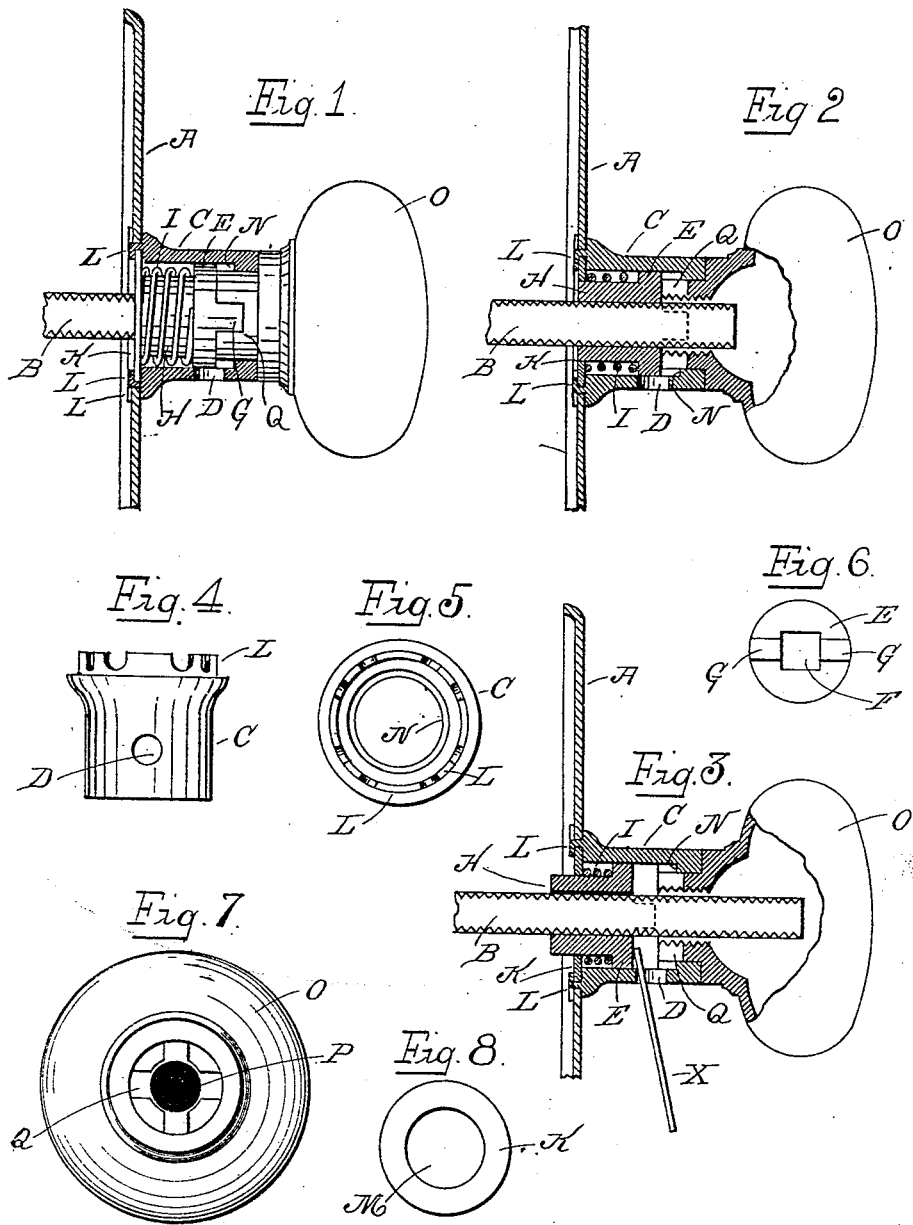

UNITED STATES PATENT OFFICE.

ALBERT A. PAGE, OF EAST HAVEN, CONNECTICUT, ASSIGNOR TO SARGENT & COMPANY, OF NEW HAVEN, CONNECTICUT, A CORPORATION OF CONNECTICUT.

KNOB ATTACHMENT.

No. 840,653.	Specification of Letters Patent.	Patented Jan. 8, 1907.

Application filed July 13, 1905. Serial No. 269,527.

*To all whom it may concern:*

Be it known that I, ALBERT A. PAGE, of the town of East Haven, county of New Haven, in the State of Connecticut, have invented new and useful Improvements in Knob Attachments, of which the following is a full, clear, and exact description, when taken in connection with the accompanying drawings, which form a part thereof, and in which—

Figure 1 represents a side elevation, partly broken away, of a knob attachment embodying my invention; Fig. 2, a longitudinal vertical section through the same; Fig. 3, a similar view, some of the parts being shown in different positions; Figs. 4 and 5, side and end elevations in detail of the inclosing sleeve; Fig. 6, an end elevation of the clutch or dog; Fig. 7, an end view of the knob, and Fig. 8 a similar view of an inclosing washer.

In all figures similar letters of reference represent like parts.

This invention relates to knob attachments, and has for its object the production of a simple and efficient attachment for securing the knob on the spindle at the proper point without the use of a fastening-screw.

To this end the invention consists of an interlocking rotary member and sliding member held in engagement with each other by a spring, one of said members being connected with the spindle and the other with the knob, the member connected with the spindle being retained within a sleeve, together with the spring as a unitary structure, together with such other improvements as are more fully set forth and claimed hereinafter.

For a better understanding of the invention reference is had to the accompanying drawings, in which the parts designated by the letter A represent the escutcheon of a door, and B the spindle, which, as shown in Figs. 1, 2, and 3, is substantially rectangular in cross-section, with its corners screw-threaded in well-known manner.

C represents a sleeve secured to the escutcheon A by means of lugs L or other suitable means. The sleeve C is provided with a perforation D on its under side.

A clutch E is provided with a rectangular axial perforation F, so that it may slide longitudinally on the spindle B, but will necessarily rotate therewith. The clutch E is adapted to fit within the sleeve C and has one or more engaging lugs G at its outer end. Its rear end H is of less diameter than its head and is shown surrounded by a coiled spring I, which presses at one end against the head of the clutch E and at its other end against a washer K, secured to the rear of the sleeve C by means of lugs or flanges L. The washer K has a perforation M sufficiently large for the passage of the reduced rear end H of the clutch E.

The sleeve C has an inwardly-projecting flange N, adapted to engage the head of the clutch E to prevent its being forced out of the sleeve C by the spring I.

The knob O is provided with an axial bore P, internally screw-threaded to engage the screw-threading on the corners of the spindle B in well-known manner. The inner end of the knob is provided with a series of radial notches Q, each sufficiently large to receive one of the lugs G of the clutch E.

The operation of the device is as follows: When the spindle and knob are removed, the sleeve C, clutch E, spring I, and washer K remain on the escutcheon A as a unitary structure. When the spindle is inserted through the door, its end projects through the clutch E. A rod or pin X may then be inserted through the perforation D in the under side of the sleeve C and the clutch E engaged and forced rearward against the tension of the spring I, as shown more particularly in Fig. 3. While the clutch E is in this position the knob O is screwed on the spindle until it comes in contact with the end of the sleeve C. The removal of the rod X permits the clutch E to be forced outward by the spring I, and the lugs G on the face of the clutch E will engage notches Q on the end of the knob. As the clutch E rotates with the spindle B and the knob O is engaged by the lugs G of the clutch E, the knob O will thereupon rotate with the spindle B.

To remove the knob O, it is only necessary to insert the rod X and press the clutch E rearward, whereupon the knob O may be unscrewed, after which the spindle B may be drawn longitudinally out through the axial perforation F of the lug G.

Having now described my invention, what

I claim, and desire to secure by Letters Patent, is—

1. In a knob attachment, the combination with a spindle; of a knob adapted to be screwed thereon; a sleeve adapted to be secured to the door, or other article; a clutch within said sleeve slidable on said spindle to rotate therewith; means for engaging said clutch and knob to prevent independent rotation; a spring within said sleeve for holding said clutch and knob in engagement; and means for retaining said clutch and spring within said sleeve when said spindle is withdrawn, substantially as described.

2. In a knob attachment, the combination with a spindle; of a knob adapted to be screwed thereon; a sleeve adapted to be secured to the door, or other article; a clutch within said sleeve slidable on said spindle to rotate therewith; means for engaging said clutch and knob to prevent independent rotation; a spring within said sleeve for holding said clutch and knob in engagement; and a flange on the outer end of said sleeve adapted to retain said clutch within said sleeve when said spindle is withdrawn, substantially as described.

3. In a knob attachment, the combination with a sleeve adapted to be secured to the door, or other article; a clutch within said sleeve, having an axial perforation for the spindle of the knob; a flange at the outer end of said sleeve; a plate at the rear of said sleeve; and a spring within said sleeve bearing against said plate and said clutch; and means for securing said plate to said sleeve and said sleeve to the door, or other article, substantially as described.

In witness whereof I have hereunto set my hand on the 19th day of June, 1905.

ALBERT A. PAGE.

Witnesses:
WILLIAM H. KIRSCHNER,
ALICE A. WILSON.